US009666898B2

(12) United States Patent
Stauffer

(10) Patent No.: US 9,666,898 B2
(45) Date of Patent: May 30, 2017

(54) STORAGE BATTERY USING A UNIFORM MIX OF CONDUCTIVE AND NONCONDUCTIVE GRANULES IN A LITHIUM BROMIDE ELECTROLYTE

(71) Applicant: John E. Stauffer, Greenwich, CT (US)

(72) Inventor: John E. Stauffer, Greenwich, CT (US)

( * ) Notice: Subject to any disclaimer, the term of this patent is extended or adjusted under 35 U.S.C. 154(b) by 0 days.

(21) Appl. No.: 15/164,168

(22) Filed: May 25, 2016

(65) Prior Publication Data

US 2016/0268624 A1  Sep. 15, 2016

Related U.S. Application Data

(63) Continuation-in-part of application No. 14/337,388, filed on Jul. 22, 2014, now Pat. No. 9,509,017.

(51) Int. Cl.
*H01M 4/00* (2006.01)
*H01M 10/052* (2010.01)
*H01M 10/0568* (2010.01)
*H01M 10/0569* (2010.01)
*H01M 4/583* (2010.01)
*H01M 4/133* (2010.01)
*H01M 4/587* (2010.01)
*H01M 4/38* (2006.01)
*H01M 4/02* (2006.01)

(52) U.S. Cl.
CPC ......... *H01M 10/052* (2013.01); *H01M 4/133* (2013.01); *H01M 4/583* (2013.01); *H01M 4/587* (2013.01); *H01M 10/0568* (2013.01); *H01M 10/0569* (2013.01); *H01M 4/386* (2013.01); *H01M 2004/021* (2013.01); *H01M 2300/0025* (2013.01); *H01M 2300/0028* (2013.01)

(58) Field of Classification Search
CPC ......... H01M 10/0445; H01M 10/0477; H01M 10/0585; H01M 4/02; H01M 4/043; H01M 4/06; H01M 4/13; H01M 6/42
USPC .......................................................... 429/128
See application file for complete search history.

(56) References Cited

U.S. PATENT DOCUMENTS

| 145,494 | A | 12/1873 | Duvall |
|---|---|---|---|
| 195,511 | A | 9/1877 | Jones |
| 300,900 | A | 6/1884 | Saum |
| 317,082 | A | 5/1885 | Boyle |
| 343,367 | A | 6/1886 | Froome |
| 346,619 | A | 8/1886 | Sohall |
| 3,833,427 | A | 9/1974 | Land et al. |
| 3,862,261 | A | 1/1975 | Stoddard |
| 3,862,861 | A | 1/1975 | McClelland et al. |
| 3,862,862 | A | 1/1975 | Gillibrand et al. |
| 3,887,399 | A | 6/1975 | Seiger |
| 3,964,927 | A | 6/1976 | Villarreal-Dominguez |
| 3,976,509 | A | 8/1976 | Tsai et al. |
| 4,076,909 | A | 2/1978 | Lindstrom |
| 4,079,174 | A | 3/1978 | Beck et al. |
| 4,107,407 | A | 8/1978 | Koch |
| 4,268,589 | A | 5/1981 | Tamminen |
| 4,269,911 | A | 5/1981 | Fukuoka et al. |
| 4,327,157 | A | 4/1982 | Himy et al. |
| 4,352,869 | A | 10/1982 | Mellors |
| 4,681,981 | A * | 7/1987 | Brotz ............... H01L 35/32 136/205 |
| 4,830,718 | A | 5/1989 | Stauffer |
| 4,849,310 | A | 7/1989 | Schlaikjer |
| 5,034,291 | A | 7/1991 | Jacus |
| 5,264,298 | A | 11/1993 | Townsend |
| 5,344,528 | A | 9/1994 | Bossler et al. |
| 5,346,783 | A | 9/1994 | Tomantschger et al. |
| 5,462,821 | A | 10/1995 | Onoue et al. |
| 5,512,144 | A | 4/1996 | Stauffer |
| 5,575,901 | A | 11/1996 | Hulme et al. |
| 5,599,637 | A | 2/1997 | Pecherer et al. |
| 5,641,591 | A | 6/1997 | Kawakami et al. |
| 5,705,050 | A | 1/1998 | Sampson et al. |
| 6,010,604 | A | 1/2000 | Stauffer |
| 6,117,196 | A | 9/2000 | Snyder et al. |
| 6,183,914 | B1 | 2/2001 | Yao et al. |
| 6,235,167 | B1 | 5/2001 | Stauffer |
| 6,787,265 | B2 | 9/2004 | Phillips |
| 7,947,391 | B2 | 5/2011 | Stauffer |
| 8,927,143 | B2 | 1/2015 | Stauffer |
| 8,940,445 | B2 | 1/2015 | Stauffer |
| 9,147,912 | B2 | 9/2015 | Stauffer |
| 2002/0042986 | A1 | 4/2002 | Sato et al. |
| 2002/0068222 | A1 | 6/2002 | Ishii et al. |
| 2002/0106560 | A1 | 8/2002 | Kolb et al. |
| 2003/0077517 | A1 | 4/2003 | Nakanishi et al. |

(Continued)

FOREIGN PATENT DOCUMENTS

| EP | 0091520 A1 | 10/1983 |
|---|---|---|
| JP | 2009266675 A | 11/2009 |
| WO | 2015112855 A1 | 7/2015 |

OTHER PUBLICATIONS

CAMEO Chemicals, "Chemical Datasheet Polypropylene Glycol", Chemical Identifiers, CAMEO Chemicals version 2.5, rev. 1, CAS No. 25322-69-4, http://cameochemicals.noaa.gov/report?key=CH9002, Date unknown.

(Continued)

*Primary Examiner* — Arun Williams

(74) *Attorney, Agent, or Firm* — Young Basile Hanlon & MacFarlane, P.C.

(57) ABSTRACT

A rechargeable battery is provided with a bed of particles comprising a mixture of conductive carbon granules and nonconductive granules.

5 Claims, 1 Drawing Sheet

(56) References Cited

U.S. PATENT DOCUMENTS

| | | |
|---|---|---|
| 2003/0151392 A1 | 8/2003 | Stone et al. |
| 2003/0190524 A1 | 10/2003 | Phillips |
| 2004/0033191 A1 | 2/2004 | Wietelmann et al. |
| 2006/0222945 A1 | 10/2006 | Bowden et al. |
| 2007/0009771 A1 | 1/2007 | Leddy et al. |
| 2007/0111096 A1 | 5/2007 | Kobayashi et al. |
| 2007/0134553 A1 | 6/2007 | Kobayashi et al. |
| 2007/0190410 A1 | 8/2007 | Kobayashi et al. |
| 2008/0096078 A1 | 4/2008 | Miyake |
| 2009/0053596 A1 | 2/2009 | Stauffer |
| 2009/0169978 A1 | 7/2009 | Smith et al. |
| 2010/0047697 A1 | 2/2010 | Stauffer |
| 2010/0099018 A1 | 4/2010 | Kawase et al. |
| 2010/0248014 A1* | 9/2010 | Huang ............ H01M 2/0413 429/174 |
| 2010/0261053 A1 | 10/2010 | Stauffer |
| 2011/0171536 A1 | 7/2011 | Oki et al. |
| 2011/0262803 A1 | 10/2011 | Huang et al. |
| 2011/0274988 A1 | 11/2011 | Fan et al. |
| 2012/0171574 A1 | 7/2012 | Zhamu et al. |
| 2013/0045415 A1 | 2/2013 | Stauffer |
| 2013/0252083 A1 | 9/2013 | Stauffer |
| 2015/0207175 A1 | 7/2015 | Stauffer |

OTHER PUBLICATIONS

Chemical Book 2008, Poly(propylene glycol) (25322-69-4), Suppliers List, Basic Information, http://www.chemicalbook.com/ProductChemicalPropertiesCB4123367_EN.htm.

M. Dickey et al., "Eutectic Gallium-Indium (EGaIn): A Liquid Metal Alloy for the Formation of Stable Structures in Microchannels at Room Temperature", Advanced Functional Materials, vol. 18, pp. 1097-1104 (2008).

M.L.B. Rao, "Investigations of an Alkaline Eelctroylyte for Zn—PbO2 Cells", J. Electyrochem. Soc.: Electrochemical Science and Technology, vol. 120, No. 7, pp. 855-857, Jul. 1973.

* cited by examiner

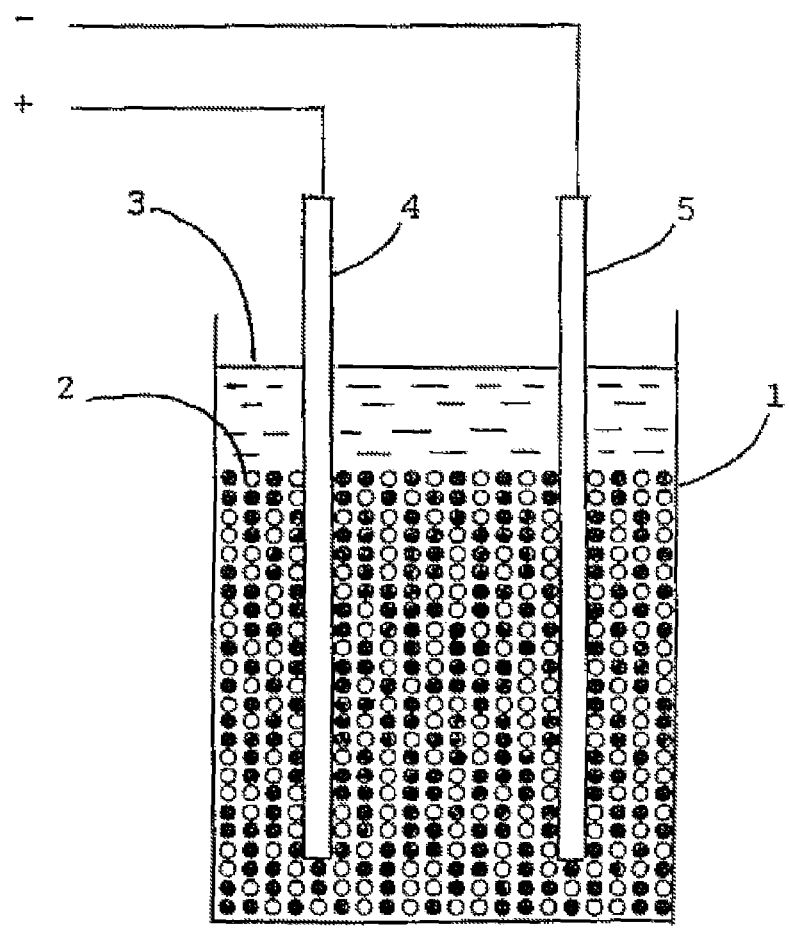

STORAGE BATTERY USING A UNIFORM MIX OF CONDUCTIVE AND NONCONDUCTIVE GRANULES IN A LITHIUM BROMIDE ELECTROLYTE

CROSS REFERENCE OF CO-PENDING APPLICATION

This application is a continuation-in-part of co-pending U.S. patent application Ser. No. 14/337,388 filed Jul. 22, 2014, entitled "LITHIUM STORAGE BATTERY," the content of which is incorporated herein in its entirety.

FIELD OF THE INVENTION

The present invention relates to a novel type of storage battery which is distinguished by its unique electrochemistry. Both positive and negative electrodes are fabricated from graphite. The electrolyte comprises an organic solution of lithium bromide. The solvent is selected from the group of lactones. Upon charging the cell a carbon bromine compound is formed at the positive electrode and a lithium carbon compound is formed at the negative electrode.

BACKGROUND OF THE INVENTION

First commercialized in the early 1990's, lithium-ion batteries are now ubiquitous. They power everything from cellphones to laptop computers to electric cars. The rapid growth of this new type of battery was sparked by several advantages including higher energy density, relatively high cell voltage, and longer charge retention or shelf life.

There are many variations of lithium ion batteries, but they all rely on the same basic chemistry. A positive electrode is made of an intercalation compound such as lithium cobalt oxide, and a negative electrode typically is lithium graphite. The electrolyte is a solution of a lithium salt such as lithium phosphorus fluoride dissolved in an aprotic organic solvent like propylene carbonate. During the operation of the cell as it is repeatedly charged and discharged, lithium ions shuttle back and forth between the positive and negative electrodes.

In spite of the successes with lithium-ion batteries, these cells have a number of drawbacks. For one, they have a low rate of discharge or power capability. Second, they have limited cycle life. And finally, they have exhibited safety problems due to the flammability of their components. Not to be overlooked, the relative high cost of lithium-ion batteries has slowed their acceptance into new applications.

For these and other reasons there is a compelling need to find an improved secondary battery. The ideal battery would retain the best features of the lithium-ion battery but avoid or minimize its disadvantages. Therefore, it is a goal of the present invention to provide such a step forward in battery technology. These and other objects, features and advantages of the present invention will be recognized from the following description and the accompanying FIGURE.

SUMMARY OF THE INVENTION

A storage battery is fabricated using conductive and nonconductive particles for electrodes. The particles are mixed in a suitable container. The electrolyte is prepared by dissolving lithium bromide in a solvent selected from the group of lactones. The lactones include butyrolactone and valerolactone.

During charging of the cell, bromine ions are attracted to the positive electrode forming a carbon bromine compound. The process is reversed upon the discharge of the cell.

Various co-solvents may be employed in the electrolyte. These include acetone and diethyl ether. The configuration of the electrodes is not fixed. They may be in the form of sheets, fibers or particles in order to maximize the electrode surface area. As required, a separator may be employed between the positive and negative electrodes to isolate them electrically.

Optionally, the negative electrode may be fabricated from silicon.

BRIEF SUMMARY OF THE DRAWINGS

The description herein makes reference to the accompanying drawings wherein like reference numerals refer to like parts throughout the several views and wherein:

FIG. 1 is a diagrammatic rendering of a prototype of the battery covered by the present invention. The principal components of the cell are illustrated in the FIGURE.

DETAILED DESCRIPTION OF THE ILLUSTRATIVE EMBODIMENT

The lithium bromide battery of the present invention comprises unique features that lead to its outstanding performance. The electrodes are fabricated in the form of a mixture of conductive and nonconductive particles. The conductive particles are carbon granules. The nonconductive particles can be silicon granules. During the operation of the battery these electrodes form complexes. The positive carbon electrode, upon charging the cell, forms a carbon bromine compound. These reactions are illustrated by the following equations.

$$C + Br^- \rightarrow CBr + e^- \quad\quad\quad 1.$$

and at the negative electrode $$C + Li^+ + e^- \rightarrow LiC \quad\quad\quad 2.$$

Combining equations 1 and 2 the following expression is obtained for the overall operation.

$$2C + Br^- + Li^+ \rightarrow CBr + LiC \quad\quad\quad 3.$$

Upon discharge these reactions are reversed.

In reality, the graphite compounds formed with bromine and lithium may differ in composition from the formulas shown above. For example, graphite reacts with lithium to give the compound LiC6. Also, graphite forms the compound C8Br when exposed to bromine vapor.

The composition of the electrolyte is critical to the success of the battery. The challenge is to find a solvent for lithium bromide. This solvent is an aprotic organic compound characterized by its low reactivity with lithium. A further requirement is that the solvent provide good ionic conductivity. To meet the wide applications for the battery, the solvent needs to have a low melting point and a high boiling point. Additionally, the solvent should be compatible with the other components of the cell.

These and other advantages of a solvent were found in a particular class of compounds comprising the lactones. These compounds are unique in that their cyclic structures contain five or six membered rings. Because the ring compounds are stable their formation is promoted.

A prototype of the battery of the present invention is shown in FIG. 1. The cell is fabricated from container 1, which holds a bed 2 of particles comprising a mixture of conductive carbon granules shown black and nonconductive silicon granules shown light. This bed of particles functions as both the positive and negative electrodes. The container is filled with electrolyte 3, a solution of lithium bromide in a lactone. Electrical leads 4 and 5 extend down into the bed of particles.

The ratio of conductive carbon granules to nonconductive granules can be adjusted in order to change the electrical conductivity of the particle bed 2. In this manner the internal resistance of the cell can be reduced without causing a short circuit. The proportion of conductive carbon particles will depend on the geometry of the cell. As FIG. 1 demonstrates, strands of conductive carbon particles, colored black in the diagram, will extend from each of the leads but fail to reach the opposite lead.

EXAMPLE

A Pyrex® test tube 1 inch in diameter by 6 inches high was used for the cell. A granular mix was prepared from 3.8 gm. graphite powder −200 mesh and 19.4 gm. silicon powder −100 mesh. This mix filled the test tube to about 3 inches high. Electrical leads were two graphite rods ¼ inch diameter by 6 inches long. The electrolyte was prepared by dissolving 7.2 gm. lithium bromide in 50 ml. gamma valerolactone. After charging the cell at 15 volts for ten minutes a cell potential of 3.58 volts was achieved.

The mechanism for the solvation of lithium bromide by lactones can be explained as follows.

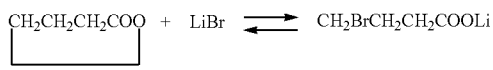

Where the lactone is butyrolactone.

The physical constants of the lactones are highly favorable. Gamma butyrolactone has a melting point of −45° C. and a boiling point of 204° to 205° C. Gamma valerolactone melts at −31° C. and boils at 207° to 208° C. Finally, delta valerolactone has a melting point of −13° to −12° C. and boils at 226° to 229° C.

Various co-solvents may be used in the preparation of the electrolyte. For example, lithium bromide is reported to dissolve in acetone as well as acetonitrile. The salt also has limited solubility in diethyl ether. The advantages of using a co-solvent are several fold. The liquid range can be extended. Also, the viscosity can be reduced thereby improving ionic mobility.

The design of the lithium bromide battery of the present invention is flexible. Both electrodes can be fabricated from graphite. These electrodes can take any shape. In addition, granular or powdered graphite can be used. One possible configuration is a bipolar cell.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A storage battery comprising:
    (a) a container substantially filled with a bed of substantially uniformly mixed particles comprising conductive carbon granules and nonconductive granules;
    (b) two electrical leads in the bed of granules, each lead contacting both conductive and nonconductive granules; and
    (c) an electrolyte consisting of a solution of lithium bromide dissolved in a lactone.

2. The storage battery of claim 1 wherein the lactone is a gamma valerolactone.

3. The storage batter of claim 1 wherein the lactone is a gamma butyrolactone.

4. The storage battery of claim 1 wherein the lactone is a delta valerolactone.

5. The storage battery of claim 1 wherein the nonconductive granules are silicon.

* * * * *